US008553033B2

(12) United States Patent
Ansari

(10) Patent No.: US 8,553,033 B2
(45) Date of Patent: Oct. 8, 2013

(54) SUBSURFACE SCATTERING IN A WAGERING GAME MACHINE

(75) Inventor: Marwan Ansari, Plainfield, IL (US)

(73) Assignee: WMS Gaming Inc., Waukegan, IL (US)

( * ) Notice: Subject to any disclaimer, the term of this patent is extended or adjusted under 35 U.S.C. 154(b) by 641 days.

(21) Appl. No.: 12/593,835

(22) PCT Filed: Mar. 28, 2008

(86) PCT No.: PCT/US2008/004131
§ 371 (c)(1),
(2), (4) Date: Sep. 29, 2009

(87) PCT Pub. No.: WO2008/121363
PCT Pub. Date: Oct. 9, 2008

(65) Prior Publication Data

US 2010/0062853 A1 Mar. 11, 2010

Related U.S. Application Data

(60) Provisional application No. 60/909,008, filed on Mar. 30, 2007, provisional application No. 60/953,589, filed on Aug. 2, 2007.

(51) Int. Cl.
*G06T 15/50* (2011.01)

(52) U.S. Cl.
USPC .......... 345/426

(58) Field of Classification Search
None
See application file for complete search history.

(56) References Cited

U.S. PATENT DOCUMENTS

| | | | | |
|---|---|---|---|---|
| 5,894,308 | A * | 4/1999 | Isaacs | 345/420 |
| 6,489,955 | B1 | 12/2002 | Newhall, Jr. | |
| 2002/0101417 | A1* | 8/2002 | Burk et al. | 345/418 |
| 2004/0181382 | A1* | 9/2004 | Hu et al. | 703/9 |
| 2004/0227757 | A1* | 11/2004 | Petrovic et al. | 345/426 |
| 2006/0202941 | A1 | 9/2006 | Morein et al. | |
| 2006/0214931 | A1 | 9/2006 | Snyder et al. | |

OTHER PUBLICATIONS

"International Application Serial No. PCT/US2008/004131, Search Report mailed Jul. 1, 2008", 4 pgs.
"International Application Serial No. PCT/US2008/004131, Written Opinion mailed Jul. 1, 2008", 6 pgs.

* cited by examiner

*Primary Examiner* — Kee M Tung
*Assistant Examiner* — Ryan D McCulley
(74) *Attorney, Agent, or Firm* — Schwegman, Lundberg & Woessner, P.A.

(57) ABSTRACT

Systems and methods provide subsurface scattering on graphical images displayed for wagering games. In one example, a technique to approximate subsurface scattering includes the use of bounding geometry to gauge a distance of a ray to the edge of the object. An implementation of this technique in a wagering game may include: receiving a graphical object; receiving a position of a light source; receiving a position of a bounding geometry; for each pixel in a set of pixels in the graphical object, performing the actions of: computing a distance from the pixel to an edge of the bounding geometry along a vector including the pixel and the ii source and determining a display property of the pixel in accordance with the distance; and displaying the set of pixels in accordance with the display property each pixel in the set of pixels.

21 Claims, 12 Drawing Sheets

SUBSURFACE SCATTERING IN A WAGERING GAME MACHINE

RELATED APPLICATIONS

This patent application is a U.S. National Stage Filing under 35 U.S.C. 371 from International Patent Application Ser. No. PCT/US2008/004131, filed Mar. 28, 2008, and published on Oct. 9, 2008, as WO 2008/121363 Al, which claims the benefit of the filing date of U.S. Provisional Patent Application Ser. No. 60/909,008, filed Mar. 30, 2007, and entitled, “WAGERING GAME MACHINE EMPLOYING A SUBSURFACE SCATTERING SHADER”, and of U.S. Provisional Patent Application Ser. No. 60/953,589, filed Aug. 2, 2007, and entitled, “SUBSURFACE SCATTERING IN A WAGERING GAME MACHINE”, the contents of which are incorporated herein by reference in their entirety.

FIELD

The embodiments relate generally to wagering game machines and more particularly to providing a subsurface scattering shader on wagering game machines.

LIMITED COPYRIGHT WAIVER

A portion of the disclosure of this patent document contains material to which the claim of copyright protection is made. The copyright owner has no objection to the facsimile reproduction by any person of the patent document or the patent disclosure, as it appears in the U.S. Patent and Trademark Office file or records, but reserves all other rights whatsoever. Copyright © 2007, 2008 WMS Gaming Inc. All Rights Reserved.

BACKGROUND

Wagering game machine makers continually provide new and entertaining games. One way of increasing entertainment value associated with casino-style wagering games (e.g., video slots, video poker, video black jack, and the like) includes offering a variety of base games and bonus events. However, despite the variety of base games and bonus events, players often lose interest in repetitive wagering game content. In order to maintain player interest, wagering game machine makers frequently update wagering game content with new game themes, game settings, bonus events, game software, and other electronic data. Further, entertainment value may be increased by providing an enhanced visual game play experience.

DETAILED DESCRIPTION

Figure 1:
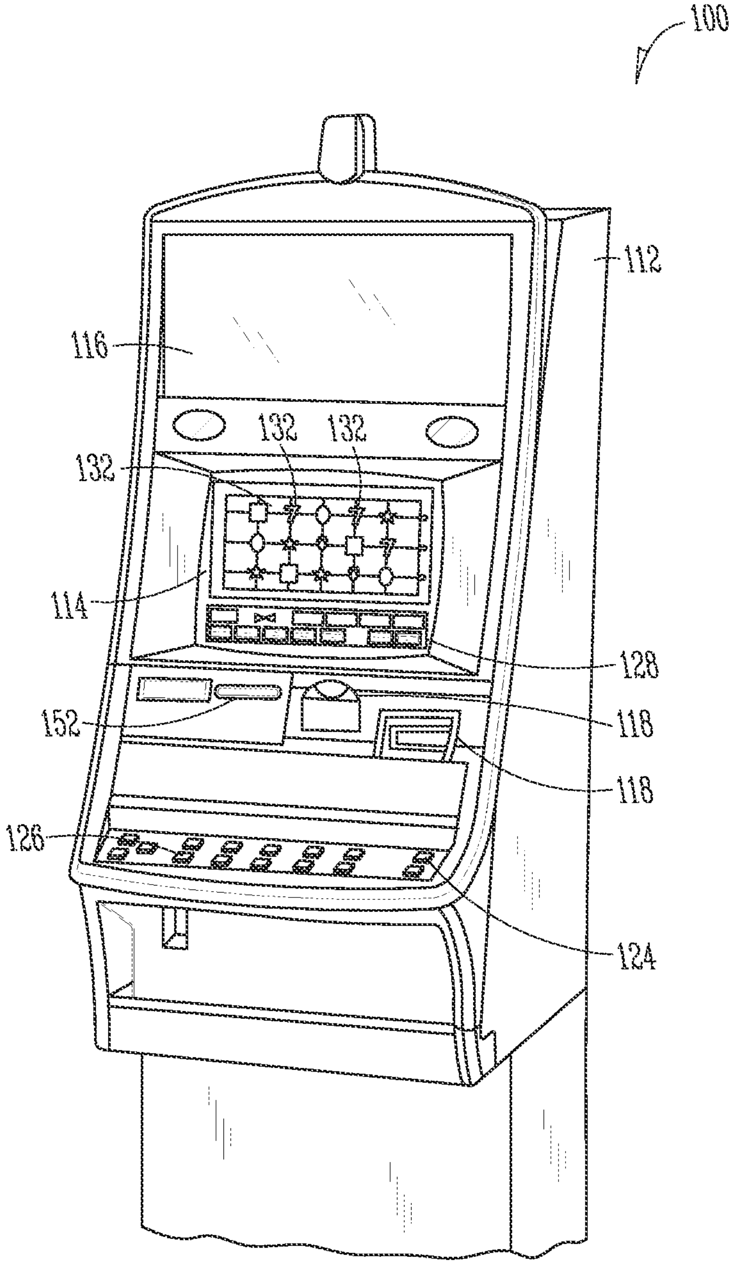
FIG. 1 is a perspective view of a wagering game machine, according to example embodiments of the invention.

In the following detailed description of exemplary embodiments of the invention, reference is made to the accompanying drawings which form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the scope of the inventive subject matter.

Some portions of the detailed descriptions which follow are presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, terms such as “processing” or “computing” or “calculating” or “determining” or “displaying” or the like, refer to the action and processes of a computer system, or similar computing device, that manipulates and transforms data represented as physical (e.g., electronic) quantities within the computer system’s registers and memories into other data similarly represented as physical quantities within the computer system memories or registers or other such information storage, transmission or display devices.

In the Figures, the same reference number is used throughout to refer to an identical component which appears in multiple Figures. Signals and connections may be referred to by the same reference number or label, and the actual meaning will be clear from its use in the context of the description.

The description of the various embodiments is to be construed as exemplary only and does not describe every possible instance of the invention. Numerous alternatives could be implemented, using combinations of current or future technologies, which would still fall within the scope of the claims. The following detailed description is, therefore, not to be taken in a limiting sense, and the scope of the present invention is defined only by the appended claims.

Example Wagering Game Machine

FIG. 1 is a perspective view of a wagering game machine, according to example embodiments of the invention. Referring to FIG. 1, a wagering game machine 100 is used in gaming establishments, such as casinos. According to embodiments, the wagering game machine 100 can be any type of wagering game machine and can have varying structures and methods of operation. For example, the wagering game machine 100 can be an electromechanical wagering game machine configured to play mechanical slots, or it can be an electronic wagering game machine configured to play video casino games, such as blackjack, slots, keno, poker, blackjack, roulette, etc.

The wagering game machine 100 comprises a housing 112 and includes input devices, including value input devices 118 and a player input device 124. For output, the wagering game machine 100 includes a primary display 114 for displaying information about a basic wagering game. The primary display 114 can also display information about a bonus wagering game and a progressive wagering game. The wagering game machine 100 also includes a secondary display 116 for displaying wagering game events, wagering game outcomes, and/or signage information. While some components of the wagering game machine 100 are described herein, numerous other elements can exist and can be used in any number or combination to create varying forms of the wagering game machine 100.

The value input devices 118 can take any suitable form and can be located on the front of the housing 112. The value input devices 118 can receive currency and/or credits inserted by a player. The value input devices 118 can include coin acceptors for receiving coin currency and bill acceptors for receiving paper currency. Furthermore, the value input devices 118 can include ticket readers or barcode scanners for reading information stored on vouchers, cards, or other tangible portable storage devices. The vouchers or cards can authorize access to central accounts, which can transfer money to the wagering game machine 100.

The player input device 124 comprises a plurality of push buttons on a button panel 126 for operating the wagering game machine 100. In addition, or alternatively, the player input device 124 can comprise a touch screen 128 mounted over the primary display 114 and/or secondary display 116.

The various components of the wagering game machine 100 can be connected directly to, or contained within, the housing 112. Alternatively, some of the wagering game machine's components can be located outside of the housing 112, while being communicatively coupled with the wagering game machine 100 using any suitable wired or wireless communication technology.

The operation of the basic wagering game can be displayed to the player on the primary display 114. The primary display 114 can also display a bonus game associated with the basic wagering game. The primary display 114 can include a cathode ray tube (CRT), a high resolution liquid crystal display (LCD), a plasma display, light emitting diodes (LEDs), or any other type of display suitable for use in the wagering game machine 100. Alternatively, the primary display 114 can include a number of mechanical reels to display the outcome. In FIG. 1, the wagering game machine 100 is an "upright" version in which the primary display 114 is oriented vertically relative to the player. Alternatively, the wagering game machine can be a "slant-top" version in which the primary display 114 is slanted at about a thirty-degree angle toward the player of the wagering game machine 100. In yet another embodiment, the wagering game machine 100 can exhibit any suitable form factor, such as a free standing model, bartop model, mobile handheld model, or workstation console model. Further, in some embodiments, the wagering game machine 100 may be include an attached chair assembly, and may include audio speakers designed to provide an enhanced audio environment. For example, a "surround sound" system may be included as part of the wagering game machine and may be integrated with the attached chair.

A player begins playing a basic wagering game by making a wager via the value input device 118. The player can initiate play by using the player input device's buttons or touch screen 128. The basic game can include arranging a plurality of symbols along a payline 132, which indicates one or more outcomes of the basic game. Such outcomes can be randomly selected in response to player input. At least one of the outcomes, which can include any variation or combination of symbols, can trigger a bonus game.

In some embodiments, the wagering game machine 100 can also include an information reader 152, which can include a card reader, ticket reader, bar code scanner, RFD transceiver, or computer readable storage medium interface. In some embodiments, the information reader 152 can be used to award complimentary services, restore game assets, track player habits, etc.

Example Portable Wagering Game Machine

Figure 2:
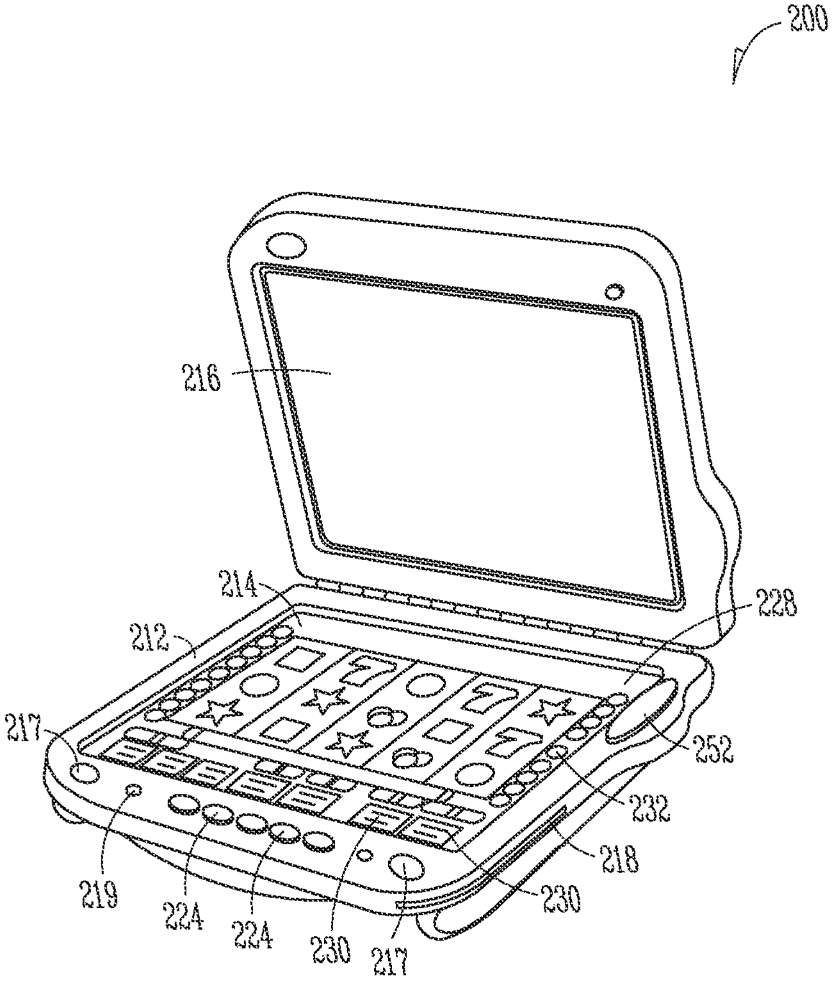
FIG. 2 is a perspective view of a portable wagering game machine according to an example embodiment.

FIG. 2 shows an example embodiment of a portable wagering game machine 200. The portable wagering game machine 200 can include any suitable electronic handheld or mobile device configured to play a video casino game such as blackjack, slots, keno, poker, blackjack, and roulette. The wagering game machine 200 comprises a housing 212 and includes input devices, including a value input device 218 and a player input device 224. For output, the wagering game machine 200 includes a primary display 214, and may include a secondary display 216, one or more speakers 217, one or more player-accessible ports 219 (e.g., an audio output jack for headphones, a video headset jack, etc.), and other conventional I/O devices and ports, which may or may not be player-accessible. In the embodiment depicted in FIG. 2, the wagering game machine 200 includes a secondary display 216 that is rotatable relative to the primary display 214. The optional secondary display 216 can be fixed, movable, and/or detachable/attachable relative to the primary display 214. Either the primary display 214 and/or secondary display 216 can be configured to display any aspect of a non-wagering game, wagering game, secondary game, bonus game, progressive wagering game, group game, shared-experience game or event, game event, game outcome, scrolling information, text messaging, emails, alerts or announcements, broadcast information, subscription information, and wagering game machine status.

The player-accessible value input device 218 can comprise, for example, a slot located on the front, side, or top of the casing 212 configured to receive credit from a stored-value card (e.g., casino card, smart card, debit card, credit card, etc.) inserted by a player. The player-accessible value input device 218 can also comprise a sensor (e.g., an RF sensor) configured to sense a signal (e.g., an RF signal) output by a transmitter (e.g., an RF transmitter) carried by a player. The player-accessible value input device 218 can also or alternatively include a ticket reader, or barcode scanner, for reading information stored on a credit ticket, a card, or other tangible portable credit or funds storage device. The credit ticket or card can also authorize access to a central account, which can transfer monetary value to the wagering game machine 200.

Still other player-accessible value input devices 218 can require the use of touch keys 230 on the touch-screen display (e.g., primary display 214 and/or secondary display 216) or player input devices 224. Upon entry of player identification information and, preferably, secondary authorization information (e.g., a password, PIN number, stored value card number, predefined key sequences, etc.), the player can be permitted to access a player's account. As one potential optional security feature, the wagering game machine 200 can be configured to permit a player to only access an account the player has specifically set up for the wagering game machine 200. Other conventional security features can also be utilized to, for example, prevent unauthorized access to a player's account, to minimize an impact of any unauthorized access to a player's account, or to prevent unauthorized access to any personal information or funds temporarily stored on the wagering game machine 200.

The player-accessible value input device 218 can itself comprise or utilize a biometric player information reader which permits the player to access available funds on a player's account, either alone or in combination with another of the aforementioned player-accessible value input devices 218. In an embodiment wherein the player-accessible value input device 218 comprises a biometric player information reader, transactions such as an input of value to the wagering game machine 210, a transfer of value from one player account or source to an account associated with the wagering game machine 200, or the execution of another transaction, for example, could all be authorized by a biometric reading, which could comprise a plurality of biometric readings, from the biometric device.

Alternatively, to enhance security, a transaction can be optionally enabled only by a two-step process in which a secondary source confirms the identity indicated by a primary source. For example, a player-accessible value input device 218 comprising a biometric player information reader can require a confirmatory entry from another biometric player information reader 252, or from another source, such as a credit card, debit card, player ID card, fob key, PIN number, password, hotel room key, etc. Thus, a transaction can be enabled by, for example, a combination of the personal identification input (e.g., biometric input) with a secret PIN number, or a combination of a biometric input with an authentication fob input, or a combination of a fob input with a PIN number, or a combination of a credit card input with a biometric input. Essentially, any two independent sources of identity, one of which is secure or personal to the player (e.g., biometric readings, PIN number, password, etc.) could be utilized to provide enhanced security prior to the electronic transfer of any funds. In another aspect, the value input device 218 can be provided remotely from the wagering game machine 210.

The player input device 224 may include a plurality of push buttons on a button panel for operating the wagering game machine 200. In addition, or alternatively, the player input device 224 can comprise a touch screen mounted to the primary display 214 and/or secondary display 216. In one aspect, the touch screen is matched to a display screen having one or more selectable touch keys 230 selectable by a user's touching of the associated area of the screen using a finger or a tool, such as a stylus pointer. A player enables a desired function either by touching the touch screen at an appropriate touch key 230 or by pressing an appropriate push button on the button panel. The touch keys 230 can be used to implement the same functions as push buttons. Alternatively, the push buttons 226 can provide inputs for one aspect of the operating the game, while the touch keys 230 can allow for input needed for another aspect of the game. The various components of the wagering game machine 200 can be connected directly to, or contained within, the casing 212, as seen in FIG. 2, or can be located outside the casing 212 and connected to the casing 212 via a variety of wired (tethered) or wireless connection methods. Thus, the wagering game machine 200 can comprise a single unit or a plurality of interconnected (e.g., wireless connections) parts which can be arranged to suit a player's preferences.

The operation of the basic wagering game on the wagering game machine 200 is displayed to the player on the primary display 214. The primary display 214 can also display a bonus game associated with the basic wagering game. The primary display 214 preferably takes the form of a high resolution LCD, a plasma display, an LED, or any other type of display suitable for use in the wagering game machine 200. The size of the primary display 214 can vary from, for example, about a 2-3" display to a 15" or 17" display. In at least some embodiments, the primary display 214 is a 7"-10" display. In one embodiment, the size of the primary display can be increased. Optionally, coatings or removable films or sheets can be applied to the display to provide desired characteristics (e.g., anti-scratch, anti-glare, bacterially-resistant and anti-microbial films, etc.). In at least some embodiments, the primary display 214 and/or secondary display 216 can have a 16:9 aspect ratio or other aspect ratio (e.g., 4:3). The primary display 214 and/or secondary display 216 can also each have different resolutions, different color schemes, and different aspect ratios.

A player typically begins play of the basic wagering game on the wagering game machine 200 by making a wager (e.g., via the value input device 218 or an assignment of credits stored on the portable wagering game machine 200 via the touch screen keys 230, player input device 224, or buttons 226) on the wagering game machine 200. In some embodiments, the basic game can comprise a plurality of symbols arranged in an array, and includes at least one payline 232 that indicates one or more outcomes of the basic game. Such outcomes can be randomly selected in response to the wagering input by the player. At least one of the plurality of randomly selected outcomes can be a start-bonus outcome, which can include any variations of symbols or symbol combinations triggering a bonus game.

In some embodiments, the player-accessible value input device 218 of the wagering game machine 200 can double as a player information reader 252 that allows for identification of a player by reading a card with information indicating the player's identity (e.g., reading a player's credit card, player ID card, smart card, etc.). The player information reader 252 can alternatively or also comprise a bar code scanner, RFID transceiver or computer readable storage medium interface. In one embodiment, the player information reader 252 comprises a biometric sensing device.

In some embodiments, a portable wagering game machine 200 can part of a portable wireless communication device, such as a personal digital assistant (PDA), a laptop or portable computer with wireless communication capability, a web tablet, a wireless telephone, a wireless headset, a pager, an instant messaging device, a digital camera, a television, or other device that can receive and/or transmit information wirelessly.

Figure 3A:
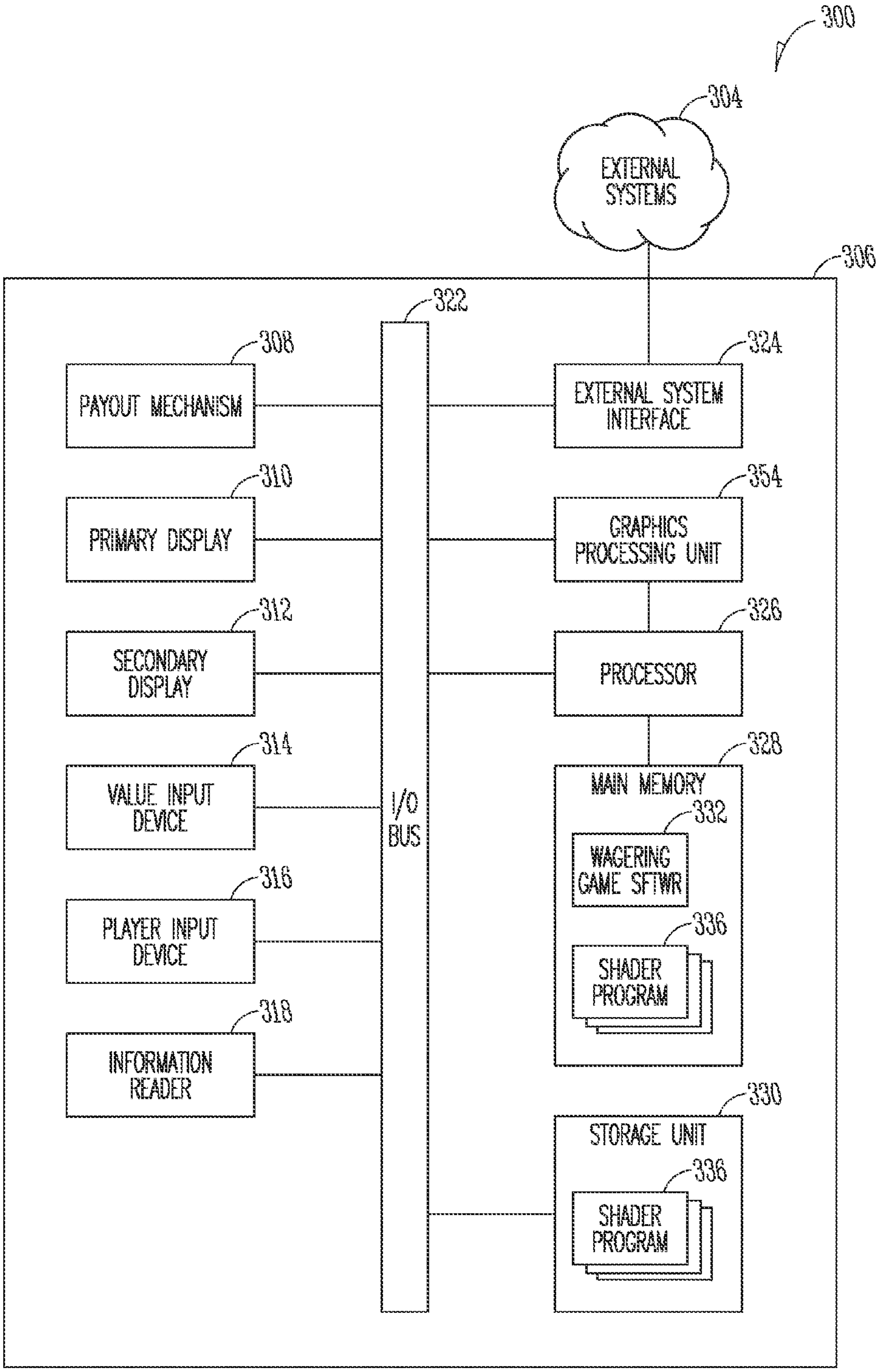
FIG. 3A is a block diagram of an architecture, including a control system, for a wagering game machine according to an example embodiment.

FIG. 3A is a block diagram illustrating a wagering game machine architecture 300, including a control system, according to example embodiments of the invention. As shown in FIG. 3A, the wagering game machine 306 includes a central processing unit (processor) 326 connected to main memory 328, which may store wagering game software 332. In one embodiment, the wagering game software can include software associated with presenting wagering games, such as video poker, video black jack, video slots, video lottery, etc., in whole or part. In addition, wagering game software 332 may include bonus rounds, themes, advertising content, attract mode content, pay tables, denomination tables, audio files, video files, operating system files and other software associated with a wagering game or the operation of a wagering game machine.

The processor 326 is also connected to an input/output (I/O) bus 322, which facilitates communication between the wagering game machine's components. The I/O bus 322 may be connected to a payout mechanism 308, primary display 310, secondary display 312, value input device 314, player input device 316, information reader 318, and/or storage unit 330. The player input device 316 can include the value input device 314 to the extent the player input device 316 is used to place wagers. The I/O bus 322 may also be connected to an external system interface 324, which is connected to external systems 304 (e.g., wagering game networks).

In general, graphics processing unit 354 processes three-dimensional graphics data and may be included as part of primary display 310 and/or secondary display 312. Graphics processing unit 354 includes components that may be used to provide a real-time three-dimensional rendering of a three-dimensional space based on input data. Various graphics engines are known in the art and may be used in various embodiments of the invention. In some embodiments, the graphics engine comprises a RenderWare graphics engine, available from Criterion Software. Graphics processing unit 354 may be implemented in software, hardware, or a combination of software and hardware.

In some embodiments, graphics processing unit 354 provides a set of one or more components that provide real-time three dimensional computer graphics for a wagering game application or other software running on a wagering game machine. Graphics processing unit 354 may also be referred to as a game engine. In some embodiments, graphics processing unit 354 provides an underlying set of technologies in an operating system independent manner such that a wagering game may be easily adapted to run on multiple platforms, including various hardware platforms such as stand-alone and portable wagering game machines and various software platforms such as Linux, UNIX, Mac OS X and Microsoft Windows families of operating systems. In some embodiments, graphics processing unit 354 may include various combinations of one or more components such as a rendering engine ("renderer") for two dimensional or three dimensional graphics, a physics engine and/or components providing collision detection, sound, scripting, animation, artificial intelligence, networking, and scene graphs. A scene graph is generally considered to be an object-oriented representation of a three dimensional game world and is designed for efficient rendering of vast virtual worlds. Thus in various embodiments, a real-time rendering of a three-dimensional model such as a scene graph is provided for a wagering game application or other software operating on a wagering game machine.

The components described above may be implemented in various combinations of software, hardware and/or firmware. Further, while shown as part of a control system 300 for a wagering game machine, graphics processing unit 354 or portions thereof may reside on systems external to the wagering game machine, such as on a game server.

In some embodiments, the components of graphics processing unit 354 may be replaced or extended with more specialized components. For example, in particular embodiments, graphics processing unit 354 may be provided as a series of loosely connected components that can be selectively combined to create a custom graphics engine for a wagering game application.

As noted above, various components may be present in a graphics processing unit 354. Some graphics engines provide real-time 3D rendering capabilities while other components outside of the graphics engine provide other functionality used by wagering games. These types of graphics engines 340 may be referred to as a "rendering engine," or "3D engine".

In some embodiments, the graphics processing unit 354 may utilize and be designed substantially in accordance with various versions of a graphics API such as Direct3D or OpenGL which provides a software abstraction of a graphics processing unit or video card. Further, in some embodiments, low-level libraries such as DirectX, SDL (Simple DirectMedia Layer), and OpenAL may also be used in presenting a wagering game in order to assist in providing hardware-independent access to other computer hardware such as input devices (mouse, keyboard, and joystick), network cards, and sound cards.

Wagering game software 332 may be loaded from storage unit 330, or it may be loaded from external systems 304 such as servers of other systems on a wagering game network (illustrated further in FIG. 2). In general, wagering game software 332 comprises modules or units that operate to present one or more wagering game upon which monetary value may be wagered. During the course of presenting the wagering games, images composed of graphical objects are displayed on primary display 310 and/or secondary display 312. The graphical objects may represent various wagering game elements such as reels, cards, dice, symbols, animations, etc., and may also represent elements of a bonus round or other ancillary wagering game software component.

Storage unit 330 and/or main memory 328 may store a shader program 336. Shader program 336 comprises a program that is designed to operate on a graphics processor 354 that may coupled to one or both of primary display 310 or secondary display 312. Shader programs 336 may also be received from an external system 304, for example via external system interface 324. In general, shader program 336 may be downloaded to the graphics processor for execution on the graphics processor, and provides commands and/or data that control the rendering of graphical objects processed by the graphics processing unit. The shader program may apply graphical characteristics such as texture, shadowing, lighting etc. to graphical objects rendered by the graphics processing unit. Further details on the operation of shader programs on a graphics processor are provided below.

In one embodiment, the wagering game machine 306 can include additional peripheral devices and/or more than one of each component shown in FIG. 3. For example, the peripherals may include a bill validator, a printer, a coin hopper, a button panel, or any of the many peripherals now found in wagering game machines or developed in the future. Further, in some embodiments, the wagering game machine 306 can include multiple external system interfaces 324 and multiple processors 326. In one embodiment, any of the components can be integrated or subdivided. Additionally, in one embodiment, the components of the wagering game machine 306 can be interconnected according to any suitable interconnection architecture (e.g., directly connected, hypercube, etc.).

In one embodiment, any of the functionality of the various components of the wagering game machine architecture 300 (e.g., the wagering game software 332) can be provided or implemented in hardware, firmware, and/or software for performing the operations described herein. Machine-readable media includes any mechanism that provides (i.e., stores and/ or transmits) information in a form readable by a machine (e.g., a wagering game machine, computer, etc.). For example, tangible machine-readable media includes read only memory (ROM), random access memory (RAM), magnetic disk storage media, optical storage media, flash memory machines, etc. Machine-readable media also includes any media suitable for transmitting software over a network.

In operation, a player may use the portable wagering game machine to activate a play of a wagering game on the machine. Using the available input mechanisms such as value input device 314 or devices coupled through player input device 316, the player may select any variables associated with the wagering game and place his/her wager to purchase a play of the game. In a play of the game, the processor 326 generates at least one random event using a random number generator (RNG) and provides an award to the player for a winning outcome of the random event. Alternatively, the random event may be generated by a remote computer using an RNG or pooling schema and then transmitted to the wagering game machine. The processor 326 operates the display 114 to represent the random event(s) and outcome(s) in a visual form that can be understood by the player. In some embodiments, a wagering game segment may be triggered based on certain events. For example, a bonus round may be triggered.

Figure 3B:
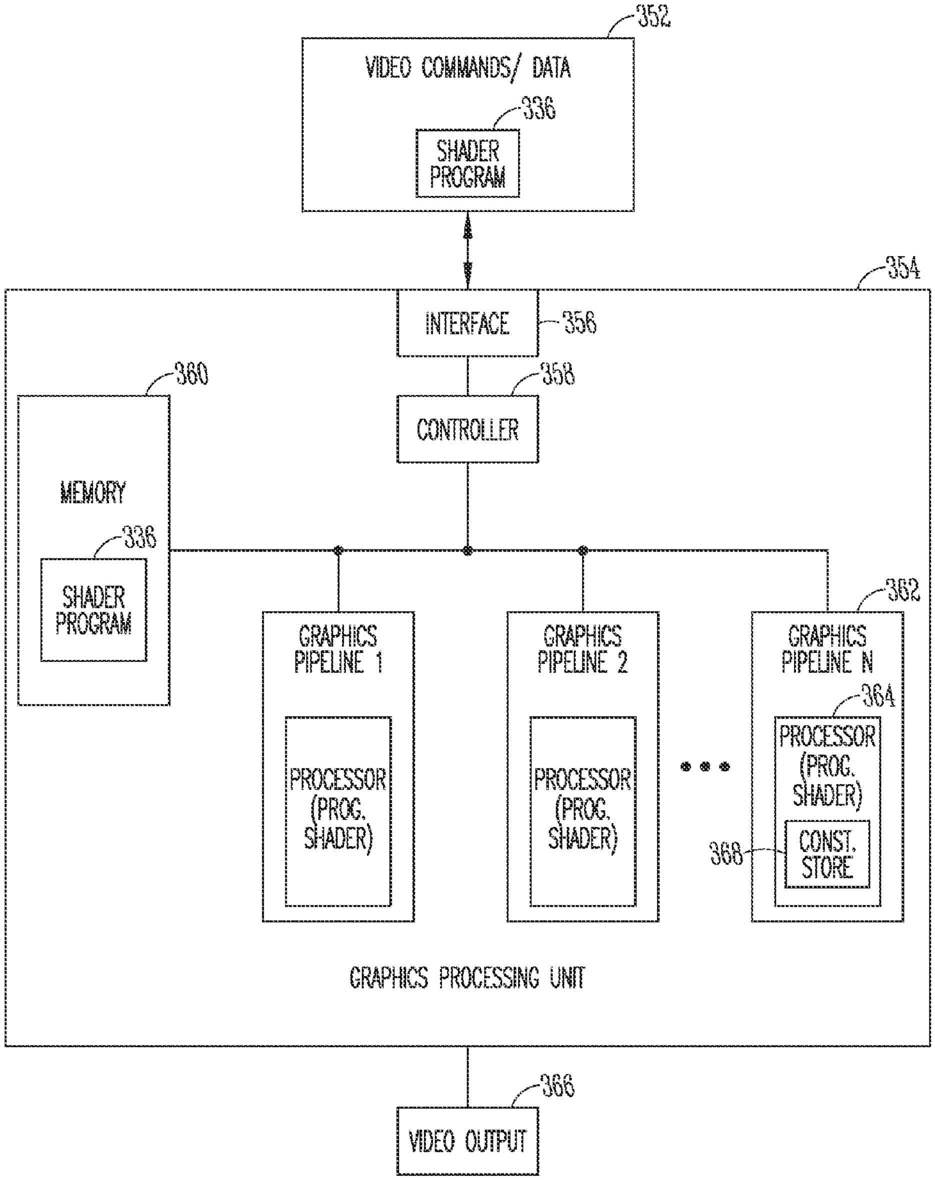
FIG. 3B is a block diagram of a graphics processing unit according to an example embodiment.

FIG. 3B is a block diagram illustrating further details of a graphics processing unit 354 according to example embodiments of the invention. Graphics processing unit 354 receives video commands and data 352 from processor 326 and produces video output 366 for presentation on a display coupled to the graphics processing unit 354. In some embodiments, graphics processing unit 354 includes an interface 356, a controller 358, memory 360 and implements one or more graphics pipelines 362. While the embodiments of the invention are not limited to any particular graphics processing unit 354, some embodiments use a graphics processing unit from the ATI RADEON® family of graphics processing units available from ATI Technologies Inc. of Markham, Ontario Canada. In alternative embodiments, a graphics processing unit from the NVIDIA family of graphics processing units available from NVIDIA Corporation of Santa Clara, Calif.

Interface 356 provides an interface between processor 326 and graphics processing unit 354. Interface 356 may be an I/O (input/output) interface or a bridge device to interface directly to processor 326. Examples of interface 356 include the Intel Northbridge and the Intel Southbridge type interfaces.

Commands/Data 352 received at Interface 356 may be processed by Controller 358. Controller 358 may be a processor used to coordinate and manage processing of video data by the graphics processing unit 354. For example, controller 358 may control the placement of commands and data into memory 360, and may manage commands and data passed to the one or more graphics pipelines 362.

As noted above, graphics processing unit 354 may include one or more graphics pipelines 362. In some embodiments, graphics processing unit may include 48 graphics pipelines 362. The inclusion of multiple graphics pipelines 362 on a graphics processing unit 354 enables graphics commands and data to be processed in parallel.

The graphics pipelines 362 may each include a processor 364. In some embodiments, the processor 364 may be referred to as a programmable shader. It should be noted that other processors may also be included as part of graphics pipeline 362. For example, a geometry processor and/or a rasterizer may also be included in a pipeline 362. Other processors or computation units may be included and may perform a variety of specialized functions that can include table lookups, scalar and vector addition, multiplication, division, coordinate-system mapping, calculation of vector normals, tessellation, calculation of derivatives, interpolation, and the like.

Programmable shader 364 may execute a shader program 336 loaded into memory 360 at run-time by controller 358. The shader program may be received from processor 326 through interface 352. In some embodiments, shader program 336 may be specified in a shader programming language that is proprietary to the graphics processing unit manufacturer. In alternative embodiments, a set or subset of "standardized" graphics operations commands and/or data may be supported. Examples of such standardized operations include various versions of DirectX or OpenGL languages.

The commands and/or data comprising shader program 336 for execution by programmable shader 364 in general include commands and/or data that control various aspects that affect the rendering of final surface properties of graphical objects to be presented on a display of a wagering game machine. For example, shader program 336 may include operations that include the calculation of one or more of: texture mapping, bump mapping, light mapping (light absorption, diffusion, reflection, refraction, shadowing), specular mapping, surface displacement, and other post-processing effects. Various parameters controlling the shading may be passed as parameters to the shader program. For example, the number of lights and lighting parameters (intensity, color etc.) may be passed as parameters to the shader program.

A programmable shader 364 may include one or more constant stores 368. A constant store may be a register, set of registers, or memory that may be used to store data for use by a shader program 336.

Various embodiments may implement one or various types of programmable shaders depending on the capabilities and requirements of a particular graphical processing unit 354. In general, the various types of programmable shaders include vertex shaders, geometry shaders, and pixel shaders. Multiple types of programmable shaders may exist on a graphics processing unit at the same time.

In general, vertex shaders operate on each vertex in a model containing three-dimensional graphical objects. Vertex shaders define a method to compute vector space transformations and other computations. In some embodiments, vertex type of programmable shader operates on basic data types, so graphical objects composed of complex structures are broken down before being passed to the vertex shader. The vertex shader receives the vertex positions of the graphical object in addition to parameters controlling the shading and positioning of the vertices defining the graphical object or objects. Functions that may be applied to the data include mesh deformation, vertex displacements, and texture coordinate transformations.

In general, pixel shaders may be used to compute pixel properties such as pixel color. Pixel shaders are typically applied for each pixel in a graphical object being processed in the pipeline. As with vertex shaders, various parameters may be supplied to the shader program to control lighting and texture computations applied to the set of pixels through the operation of the shader. For example, the parameters may specify the number, positions, intensities, and colors of one or more lights illuminating the graphical objects in a three-dimensional model.

In general, geometry shaders operate on vertices that may be grouped into primitives such as triangles, lines, strips and points. The vertices may comprise output from a vertex shader. Additionally, geometry shaders may make copies of input primitives, and as a result create new sets of vertices.

As discussed above, various parameters may be supplied to control lighting and shading. In some embodiments, the shaders may implement various types of shading models, including Gouraud shading, Phong shading and/or bump mapping.

In some embodiments, processor 326, graphics processor 354 and/or shader programs 336 may be used alone or in various combinations to produce various three-dimensional rendering effects for a wagering game machine. For example, in some embodiments, the graphics processor 354 may be operable to perform subsurface scattering. In general, subsurface scattering more accurately models the way light diffuses after it enters an object. Further, subsurface scattering more accurately models the way an object absorbs and retransmits light. As an example, such absorption and retransmission allows one to know the difference between a class of milk and a glass of white paint. While both may be white and in a container, they both absorb and retransmit light in different ways. The use of subsurface scattering techniques as described herein provides a mechanism to display object in a manner that reflects the different ways that different objects may absorb and retransmit light. Further, the systems and methods described herein provide a mechanism to perform subsurface scattering in real time and without preprocessing related to the subsurface scattering.

The systems and methods of the inventive subject matter approximate subsurface scattering by using bounding geometry to gauge a rays distance to the edge of the object.

Subsurface scattering gives cues to the viewer about an objects material property by simulating the diffusion of light through the object. The systems and methods of the inventive subject matter approximate subsurface scattering by computing the distance from a pixel to edge of a bounding sphere in the direction of the light source and uses this distance as an attenuation factor to limit the luminance of a pixel.

Figure 4:
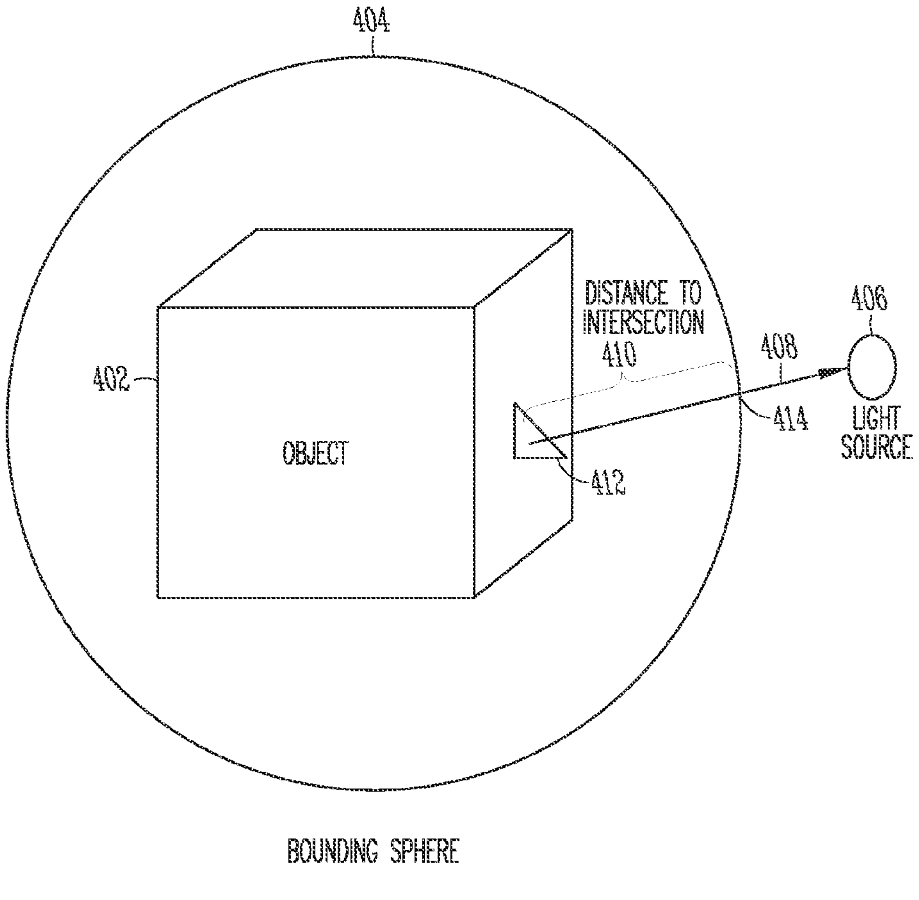
FIG. 4 is a diagram illustrating a method for performing subsurface scattering according to embodiments of the invention.

FIG. 4 pictorially illustrates subsurface scattering according to some embodiments. In some embodiments, subsurface scattering may be performed by defining a bounding geometry 404 around a graphical object 402 to be rendered. In some embodiments, bounding geometry 404 may be a sphere. A general description of the method performed for each pixel is as follows. As an example, a pixel 412 on the face of the object 402 will be used. A distance 410 is calculated from the pixel 412 to an intersection point 414 on the bounding sphere 404 along a ray or vector (i.e., a light vector) 408 from pixel 412 to light source 406.

Figure 5:
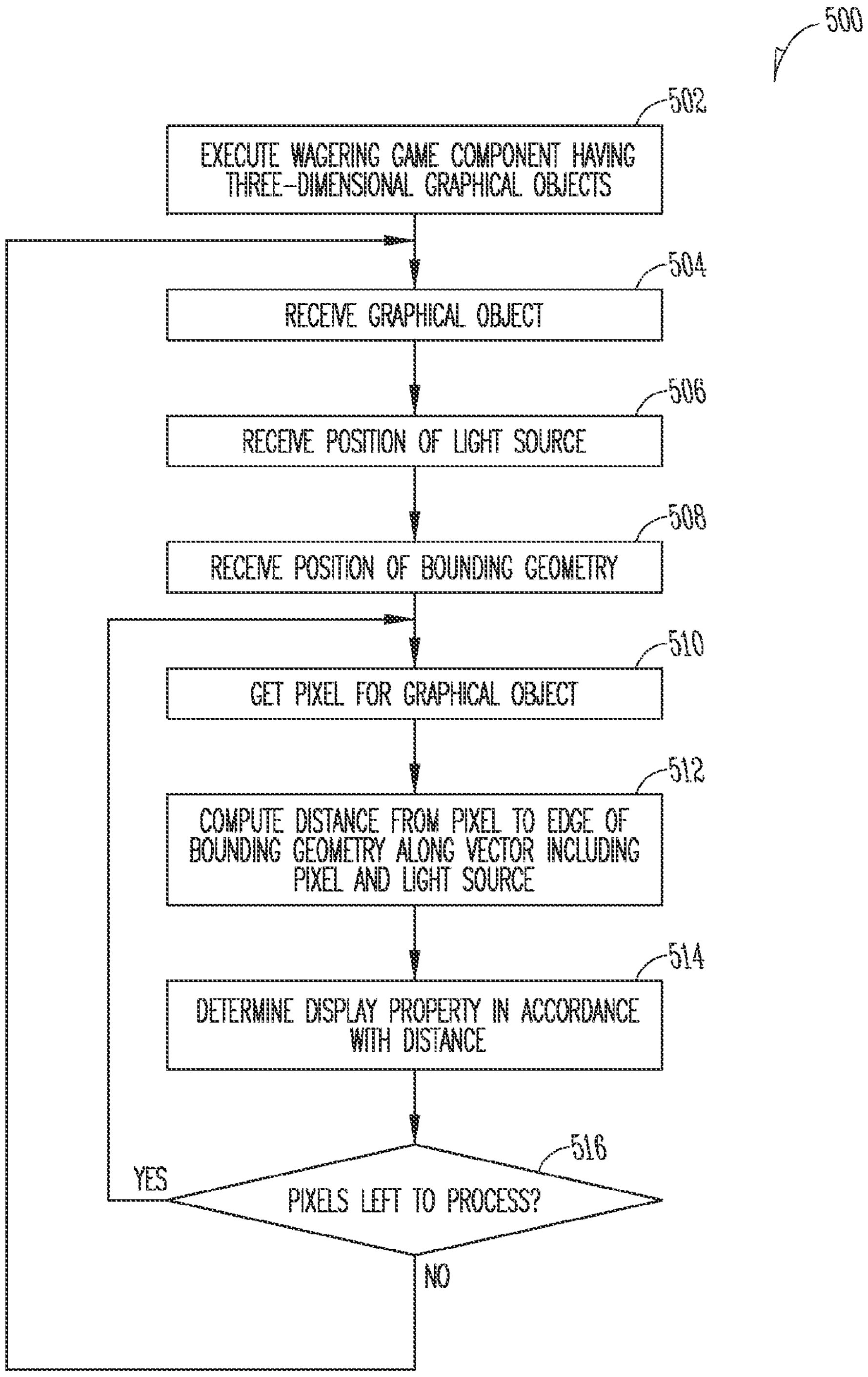
FIG. 5 is a flowchart illustrating methods according to embodiments of the invention.

FIG. 5 illustrates methods for performing subsurface scattering according to embodiments of the invention. As used herein, the term "receiving" includes reading data from a memory or register, receiving data from a network interface, receiving data in a graphics pipeline, receiving data calculated by a special purpose calculation engine or any other mechanism for obtaining data.

The method begins at block 502 by executing a wagering game component for a wagering game upon which monetary value may be wagered. The wagering game component may be a base wagering game, a bonus round for a wagering game, an episode of a wagering game, advertisement displayed on the wagering game, idle or attract mode software, or any other software executing on a wagering game machine. The component may have graphical objects that are rendered and displayed on one of the displays of the wagering game machine.

At block 504, a system executing the method receives a graphical object for the wagering game component. The graphical object may be symbol on a reel, the reel itself, dice, balls, characters, cards, backgrounds, buildings or any other object displayed as part of a wagering game component. The inventive subject matter is not limited to any particular type of graphical object.

At block 506, a system executing the method receives the position of a light source.

At block 508, a system executing the method receives the position and size of bounding geometry. In some embodiments, the bounding geometry may be a sphere. The use of a sphere for the bounding geometry is desirable for speed and simplicity. However, as noted below, other types of bounding geometry may be used. In some embodiments, an equation describing the position and size of the bounding geometry is loaded into a constant store of a pixel shader.

At block 510, a pixel of the graphical object is obtained for processing. In some embodiments, the graphical object may be described by a plurality of vertices. A vertex shader computes the real world space position of each vertex and passes the position to a pixel shader. The real world position of the pixel may then be obtained by interpolation.

At block 512, a system executing the method computes the distance from the pixel to the edge of the bounding geometry along a light vector formed by the pixel and the light source. In those embodiments where the bounding geometry is a sphere, the intersection of the light vector with the bounding geometry may be determined by the following formula:

s=vector from pixel to sphere center $$\lambda=(s\cdot\text{lightvector})^2+\sqrt{(s\cdot\text{lightvector})^2-\|s\|^2+\text{radius}^2)}$$

$$\text{Intersection}=pos+(\lambda,{}^*\text{lightvector}) \quad (1)$$

The distance from the pixel to the intersection point may then be computed.

In some embodiments, it is desirable that the light source position, bounding sphere center, and current pixel position in 3-space be in the same coordinate system.

At block 514, the distance, or a value derived from the distance, may be used to determine a display property. In some embodiments, the distance value is scaled to map the value into the range [0,1]. Further in some embodiments, the distance value may be scaled. In particular embodiments, a scale factor of the radius*0.2 of the bounding sphere is used. Other mappings may be used to achieve desired effects and are within the scope of the inventive subject matter.

The scaled distance may then be used to determine a display property. In some embodiments, the scaled distance is used to sample or perform a look-up for a 1D texture that has been defined such that the 1d texture describes a material's subsurface scattering properties. In alternative embodiments, the distance may be used to determine a luminance value for the pixel. For example, the distance may be used as an attenuation factor to limit the luminance of the pixel.

At block 516, a system executing the method determines if there are pixels left to process. If so, the method returns to block 510 to process the next pixel of the graphical object. Otherwise, the method returns to block 504 to process the next graphical object, if any.

It should be noted that the actions described above need not occur in the precise order indicated above. For example, blocks 504, 506 and 508 may be executed in any order.

Figure 6A:
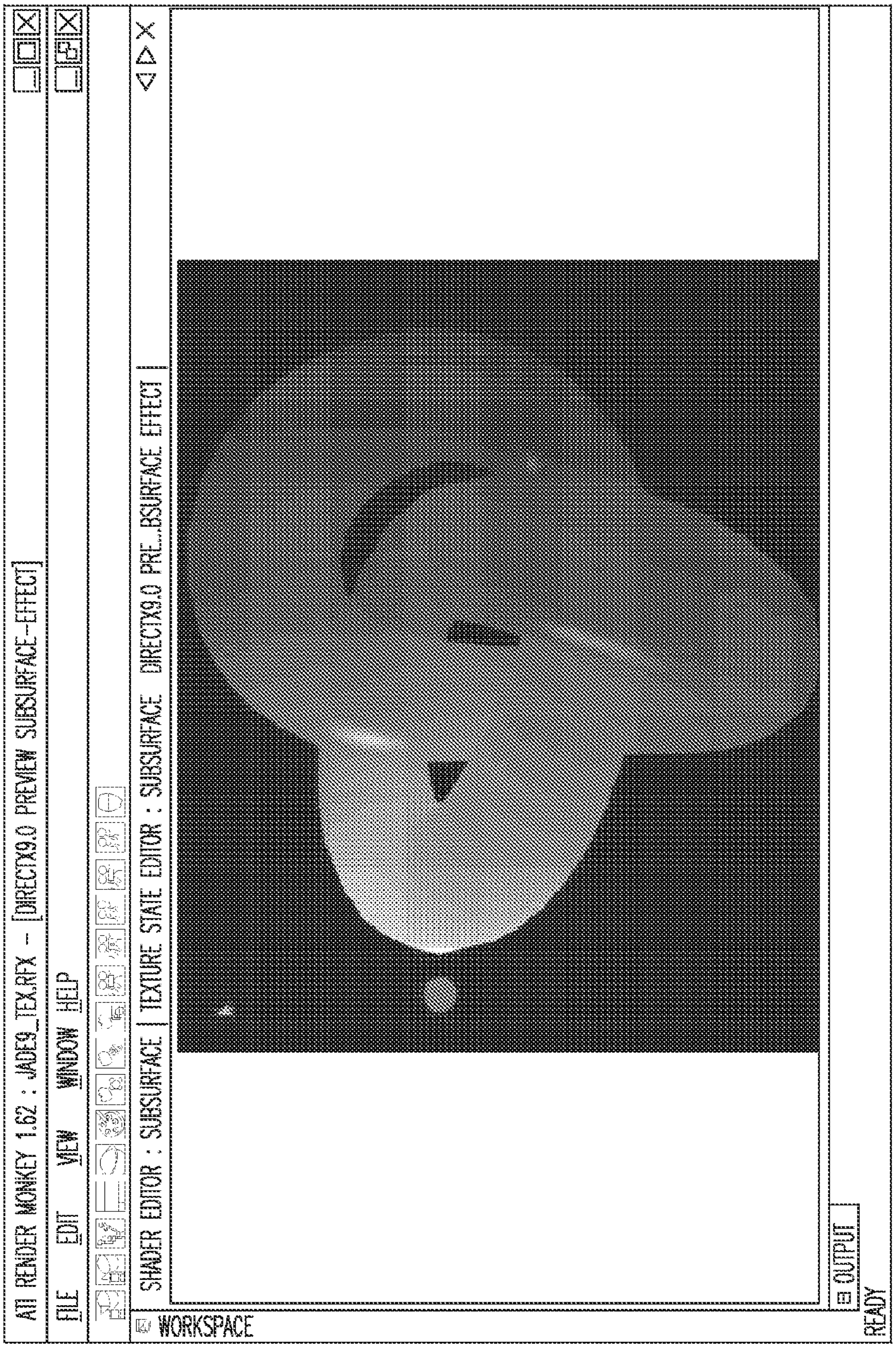
FIGS. 6A-6C are example displays illustrating the effects of subsurface scattering
Figure 6B:
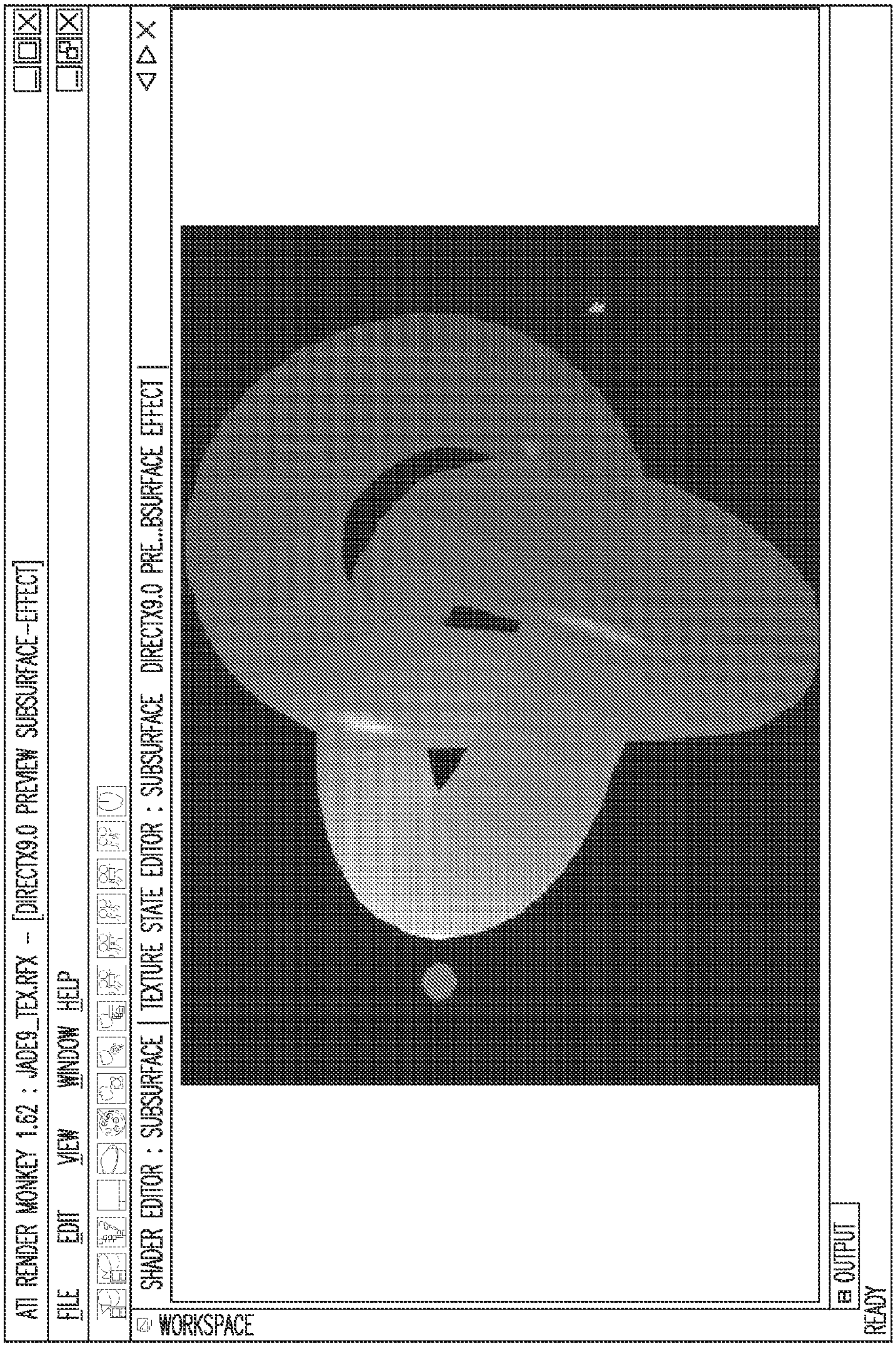
Figure 6C:
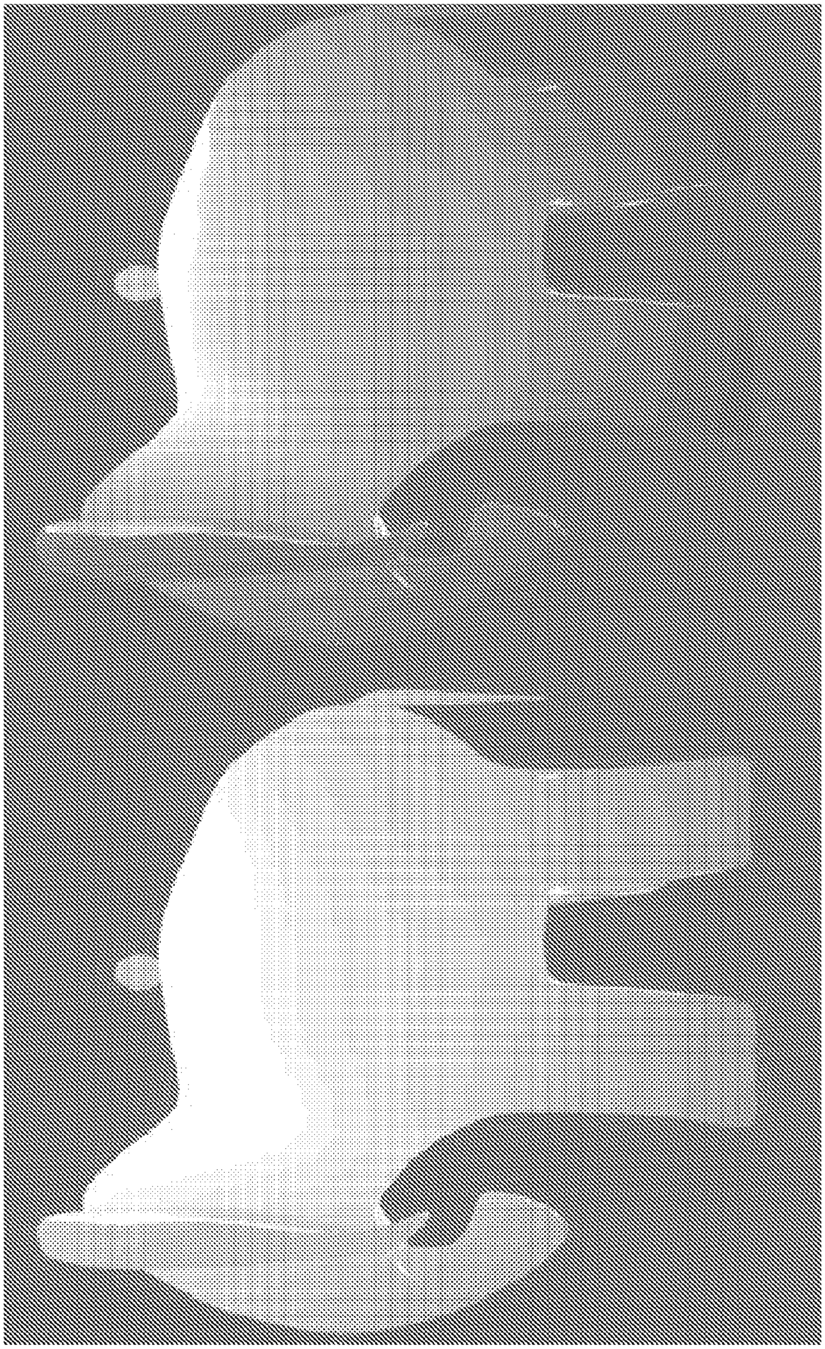

FIGS. 6A and 6B illustrate the rendering of an object without and with subsurface scattering employed during the rendering process. FIG. 6C shows two images of an elephant. The elephant on the left is rendered with standard light attenuation, while the elephant on the right is rendered with standard light attenuation and approximated subsurface scattering using the systems and methods described herein.

Figure 7:
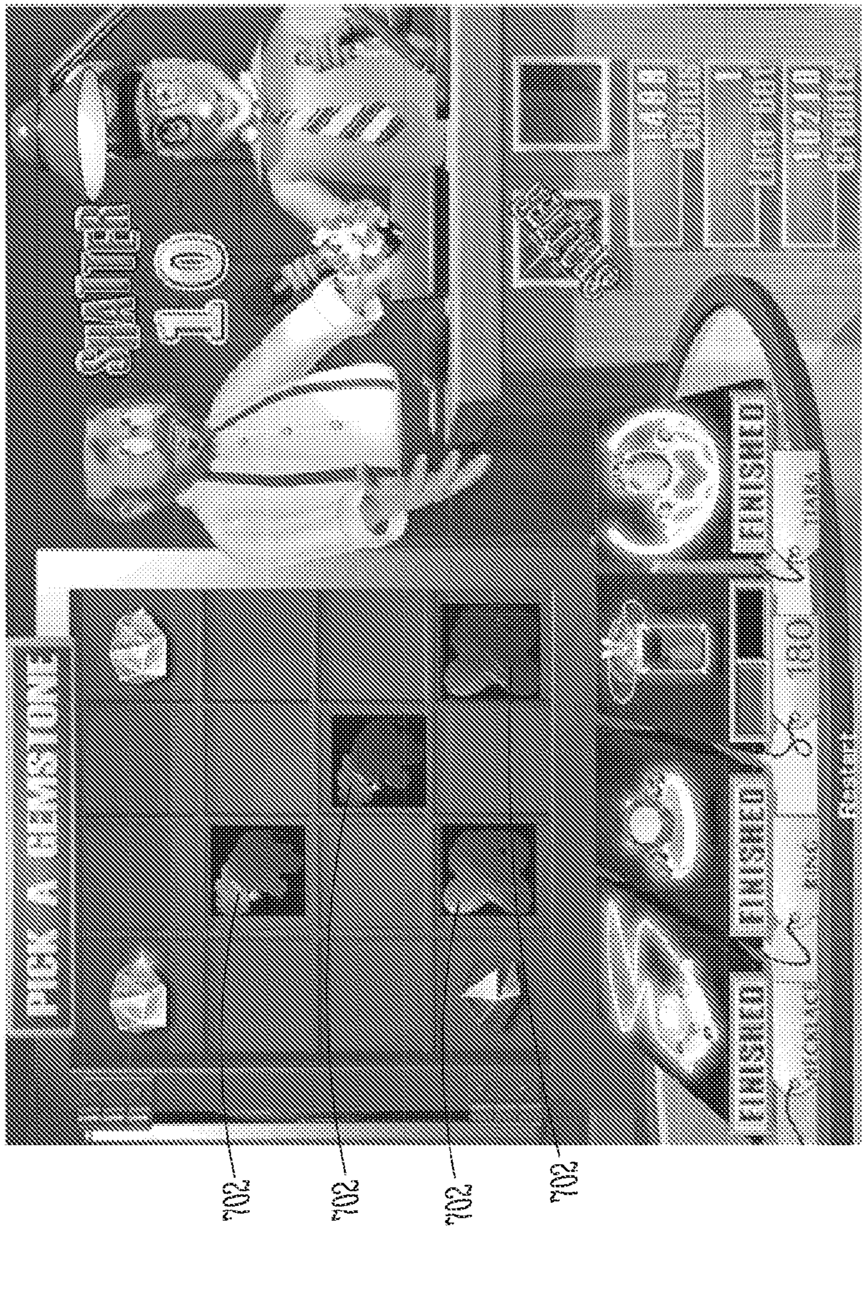
FIG. 7 is an example screen image illustrating a wagering game with objects rendered using subsurface scattering according to embodiments of the invention.

FIG. 7 illustrates the use of subsurface scattering in an example wagering game image. In the example shown, the gemstones 702 in the image may be rendered using subsurface scattering, resulting in a more realistic image of the gemstones. For example, the appearance of jade may be accurately rendered using the systems and methods of the embodiments illustrated herein. Other types of objects that may be rendered using subsurface scattering include skin, area fog, various types of liquids (milk, paint etc.) or planets. Among others, any type of object where it is desirable to render the object such that it has an inner glow may be rendered using the systems and methods of the embodiments of the inventive subject matter.

Graphical objects may be rendered using the subsurface scattering systems and methods described herein in response to various game related events. For example, graphical objects that are selectable may be rendered using sub-surface scattering to differentiate the objects from those that are not selectable. Alternatively, graphical objects that have been selected may be rendered using sub-surface scattering while those objects that are not selectable, or that remain to be selected may be rendered without subsurface scattering.

Figure 8A:
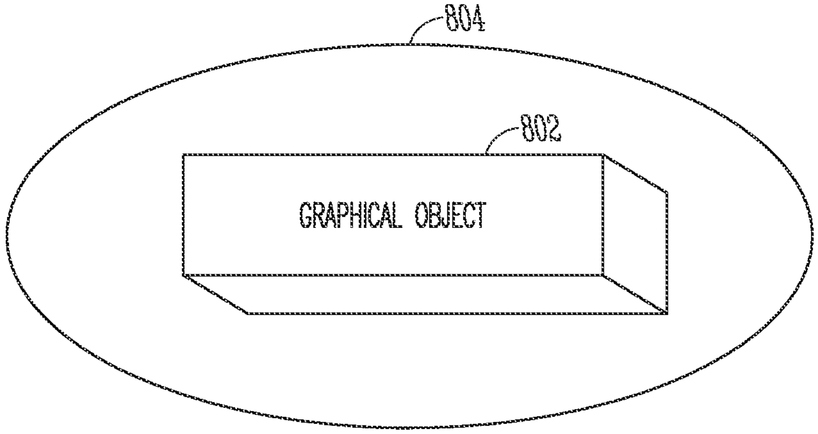
FIGS. 8A-8C illustrate various bounding geometries used in varying embodiments of the invention.
Figure 8B:
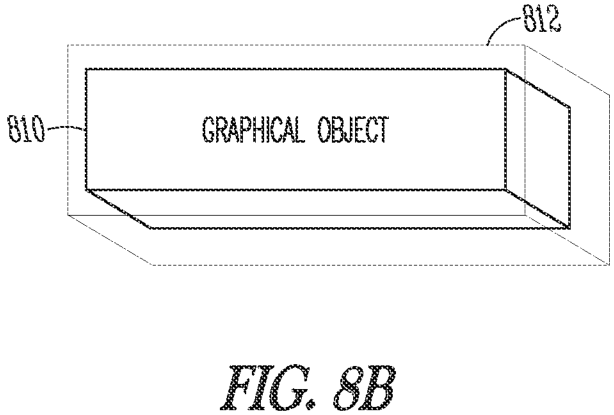

The above description of subsurface scattering has used a bounding sphere, however other bounding geometries or shapes may be used and are within the scope of the inventive subject matter. For example, as illustrated in FIG. 8A, a bounding ellipsoid 804 may be used for a graphical object 802. Further, as illustrated in FIG. 8B, a bounding rectangle 812 may be used for a graphical object 810.

Figure 8C:
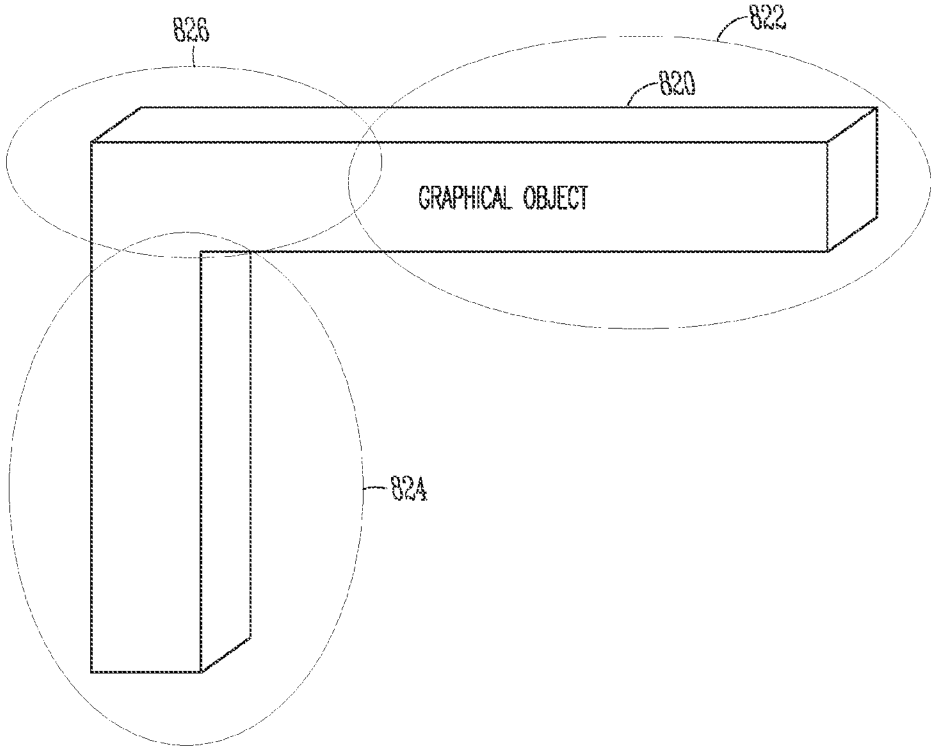

Additionally, as illustrated in FIG. 8C, different bounding geometries may be used to render different portions of a graphical object 820. In the example shown, two bounding ellipsoids 822 and 826 and a bounding sphere 824 are used to render the L shaped object 820. In some embodiments, the decision as to which type of bounding shape to use may be made in a programmable shader.

Conclusion

Systems and methods for presenting a wagering game segment in which a player navigates through a three-dimensional space on a display of a wagering game machines have been described. Although specific embodiments have been illustrated and described herein, it will be appreciated by those of ordinary skill in the art that any arrangement which is calculated to achieve the same purpose may be substituted for the specific embodiments shown. For example, while illustrated as part of a wagering game machine, the systems and methods have applicability to other systems employing graphical displays. This application is intended to cover any adaptations or variations of the inventive subject matter.

The terminology used in this application is meant to include all of these environments. It is to be understood that the above description is intended to be illustrative, and not restrictive. Many other embodiments will be apparent to those of skill in the art upon reviewing the above description. Therefore, it is manifestly intended that this invention be limited only by the following claims and equivalents thereof.

The Abstract is provided to comply with 37 C.F.R. §1.72(b) to allow the reader to quickly ascertain the nature and gist of the technical disclosure. The Abstract is submitted with the understanding that it will not be used to limit the scope of the claims.

What is claimed is:

1. A system comprising:

at least one processor and at least one memory operable to present a component of a wagering game upon which monetary value may be wagered; and at least one graphics processing unit coupled to the at least one processor, the graphical processor operable to:

receive a graphical object fir the component, the graphical Object having a defined shape;

receive a position of a light source;

define a bounding geometry from a single three-dimensional spherical geometrical shape, the three-dimensional spherical geometrical shape being sized and positioned to surround the defined shape of the graphical object, and the three-dimensional spherical geometrical shape being independent of and distinct from an edge outline of the graphical object;

perform subsurface scattering approximation for respective pixels of the graphical object using a proximity of the respective pixels to a surface of the spherical geometrical shape surrounding the object by performing, for each of the respective pixels in the graphical object, actions that:

compute a distance within the spherical geometrical shape, by a measurement of the distance starting from the pixel and extending to the surface of the spherical geometrical shape along a vector including the pixel and the light source, and determine a subsurface scattering display property of the pixel in accordance with the distance; and display the respective pixels in accordance with the subsurface scattering display property of each pixel.

2. The system of claim 1, wherein the subsurface scattering display property is a luminance of the pixel.

3. The system of claim 1, wherein the subsurface scattering display property is a one dimensional texture.

4. The system of claim 1, wherein the graphical processor is further operable to scale the distance.

5. The system of claim 4, wherein operations to scale the distance include mapping the distance to a value between 0 and 1.

6. The system of claim 4, wherein the scaled distance is calculated using a scaling factor determined by squaring a radius of the bounding geometry.

7. The system of claim 1, wherein the graphical processing unit includes a shader and wherein an equation determining a position and size of the bounding geometry is stored into a constant store of the shader.

8. The system of claim 1, wherein the graphical processor includes a vertex shader operable to determine a world space position for each vertex in the graphical object and a pixel shader operable to utilize the world space position to determine a world space position for each pixel in the graphical object.

9. The system of claim 1, wherein the bounding geometry is positioned around the graphical object to include the entirety of the graphical object, and wherein the subsurface scattering approximation is performed for the graphical object upon the set of pixels defining the entirety of the graphical object.

10. A method for execution by one or more processors, the method comprising:

receiving a graphical object in a wagering game upon which monetary value may be wagered, the graphical Object having a defined shape;

receiving a position of a light source;

defining a bounding geometry from a single three-dimensional spherical geometrical shape, the three-dimensional spherical geometrical shape being sized and positioned to surround the graphical object, and the three-dimensional spherical geometrical shape being independent of and distinct from an edge outline of the graphical object;

performing subsurface scattering approximation for respective pixels of the graphical object using a proximity of the respective pixels to a surface of the spherical geometrical shape surrounding the object, by performing the actions of:

computing by the one or more processors a distance within the spherical geometrical shape, by a measurement of the distance starting from the pixel and extending to the surface of the spherical geometrical shape along a vector including the pixel and the light source, and determining by the one or more processors a subsurface scattering display property of the pixel in accordance with the distance; and displaying the respective pixels in accordance with the subsurface scattering display property for the respective pixels.

11. The method of claim 10, wherein the subsurface scattering display property is a luminance of the pixel.

12. The method of claim 10, wherein the subsurface scattering display property is a one dimensional texture.

13. The method of claim 10, further comprising scaling the distance.

14. The method of claim 13, wherein scaling the distance maps the distance to a value between 0 and 1.

15. The method of claim 13, wherein scaling the distance utilizes a scaling factor determined by squaring a radius of the bounding geometry.

16. The method of claim 10, further comprising storing an equation determining a position and size of the hounding geometry into a constant store of a shader.

17. The method of claim 10, further comprising:

determining a world space position for each vertex in the graphical object;

utilizing the world space position to determine a world space position for a pixel in the graphical object; and passing the world space position of the vertex to a pixel shader;

wherein the world space position of each vertex is determined by a vertex shader.

18. The method of claim 10, wherein the bounding geometry is positioned around the graphical object to include the entirety of the graphical object, and wherein the subsurface scattering approximation is performed for the graphical Object upon the set of pixels defining the entirety of the graphical object.

19. A non-transitory machine-readable storage medium having machine executable instructions for causing one or more processors to perform a method, the method comprising:

receiving a graphical object in a wagering game upon which monetary value may wagered, the graphical object having a defined shape;

receiving a position of a light source;

defining a bounding geometry from a single three-dimensional spherical geometrical shape, the three-dimensional spherical geometrical shape being sized and positioned to surround the graphical object, and the three-dimensional spherical geometrical shape being independent of and distinct from an edge outline of the graphical object;

performing subsurface scattering approximation for respective pixels of the graphical object using a proximity of the respective pixels to a surface of the spherical geometrical shape surrounding the object for each of the respective pixels in the graphical object, by performing the actions of:

computing a distance within the spherical geometrical shape, by a measurement of the distance starting from the pixel and extending to the surface of spherical geometrical shape along a vector including the pixel and the light source, and determining a subsurface scattering display property of the pixel in accordance with the distance; and displaying the respective pixels in accordance with the subsurface scattering display property for each pixel in the respective pixels.

20. The machine-readable storage medium of claim 19, wherein the bounding geometry is positioned around the graphical object to include the entirety of the graphical object, and wherein the subsurface scattering approximation is performed for the graphical object upon the set of pixels defining the entirety of the graphical object.

21. The machine-readable storage medium of claim 19, wherein the subsurface scattering display property is a luminance of the pixel or is a one dimensional texture, and wherein the machine executable instructions further cause the one or more processors to perform method operations including scaling the distance within the spherical geometrical shape, wherein scaling the distance maps the distance to a value between 0 and 1 or utilizes a scaling factor determined by squaring a radius of the bounding geometry.

* * * * *

UNITED STATES PATENT AND TRADEMARK OFFICE

CERTIFICATE OF CORRECTION

PATENT NO. : 8,553,033 B2
APPLICATION NO. : 12/593835
DATED : October 8, 2013
INVENTOR(S) : Marwan Ansari It is certified that error appears in the above-identified patent and that said Letters Patent is hereby corrected as shown below:

On the Title page, in column 2, under “(57) Abstract”, line 11, delete “ii” and insert --light--, therefor On the Title page, in column 2, under “(57) Abstract”, line 12, delete “source” and insert --source,--, therefor On the Title page, in column 2, under “(57) Abstract”, line 14, after “property”, insert --for--, therefor In the Specification In column 1, line 9, delete “Al” and insert --A1--, therefor In column 2, line 2, after “scattering”, insert --.--, therefor In column 4, line 16, delete “RFD” and insert --RFID--, therefor In column 5, line 23, delete “210,” and insert --200,--, therefor In column 5, line 49, delete “210,” and insert --200,--, therefor In column 9, line 20, delete “114” and insert --310--, therefor In column 9, line 27, after “invention.”, insert --¶--, therefor In column 9, line 46, before “Commands/Data”, insert --Video--, therefor In column 11, line 15, delete “class” and insert --glass--, therefor Signed and Sealed this
Third Day of December, 2013

Margaret A. Focarino

Margaret A. Focarino
*Commissioner for Patents of the United States Patent and Trademark Office*

In column 12, line 28, (Approx.) delete "radius$^2$)" and insert --radius$^2$--, therefor In column 12, line 31, (Approx.) delete "λ," and insert --λ--, therefor In column 12, line 36, delete "3-space" and insert --3D-space--, therefor In the Claims In column 14, line 8, in claim 1, delete "fir" and insert --for--, therefor In column 14, line 9, in claim 1, delete "Object" and insert --object--, therefor In column 14, line 66, in claim 10, delete "Object" and insert --object--, therefor In column 15, line 11, in claim 10, delete "object," and insert --object--, therefor In column 15, line 37, in claim 16, delete "hounding" and insert --bounding--, therefor In column 16, line 2, in claim 18, delete "Object" and insert --object--, therefor In column 16, line 9, in claim 19, after "may", insert --be--, therefor In column 16, line 27, in claim 19, after "of", insert --the--, therefor

UNITED STATES PATENT AND TRADEMARK OFFICE

CERTIFICATE OF CORRECTION

PATENT NO. : 8,553,033 B2
APPLICATION NO. : 12/593835
DATED : October 8, 2013
INVENTOR(S) : Marwan Ansari It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 733 days.

Signed and Sealed this
Fifteenth Day of September, 2015

Michelle K. Lee

Michelle K. Lee
*Director of the United States Patent and Trademark Office*